(12) United States Patent
Petrella (10) Patent No.: US 10,910,681 B2
(45) Date of Patent: Feb. 2, 2021

(54) PORTABLE RENEWABLE ENERGY POWER SYSTEM

(71) Applicant: Unlimited Power, Ltd., Greenville, SC (US)

(72) Inventor: Christopher J. Petrella, Greer, SC (US)

(73) Assignee: RavenSafe, LLC, Leominster, MA (US)

(*) Notice: Subject to any disclaimer, the term of this patent is extended or adjusted under 35 U.S.C. 154(b) by 0 days.

(21) Appl. No.: 16/110,947

(22) Filed: Aug. 23, 2018

(65) Prior Publication Data

US 2018/0366789 A1 Dec. 20, 2018

Related U.S. Application Data

(63) Continuation-in-part of application No. 15/829,465, filed on Dec. 1, 2017, now Pat. No. 10,084,213, (Continued)

(51) Int. Cl.
*H02J 7/00* (2006.01)
*H01M 10/46* (2006.01)
(Continued)

(52) U.S. Cl.
CPC ......... *H01M 10/465* (2013.01); *A45C 3/00* (2013.01); *H01M 10/441* (2013.01); *H02J 7/0063* (2013.01); *H02J 7/35* (2013.01); *H02M 7/44* (2013.01); *H02S 10/40* (2014.12); *H02S 30/20* (2014.12); *H02S 40/30* (2014.12); *H02S 40/32* (2014.12); *H02S 40/38* (2014.12); *A45C 15/00* (2013.01); *H01M 2010/4271* (2013.01); *H02J 7/0013* (2013.01); *H02J 7/0047* (2013.01); *H02J 7/0048* (2020.01); *H02J 7/0049* (2020.01); *H02J 2007/0067* (2013.01)

(58) Field of Classification Search
USPC .................................................. 320/101, 136
See application file for complete search history.

(56) References Cited

U.S. PATENT DOCUMENTS

| 5,522,943 A | 6/1996 | Spencer et al. |
| 5,969,501 A | 10/1999 | Glidden et al. |

(Continued)

*Primary Examiner* — Samuel Berhanu
(74) *Attorney, Agent, or Firm* — Kim and Lahey Law Firm LLC; Douglas W. Kim (57) ABSTRACT

A portable power system comprising: a set of battery cells; a power outlet; a control module programmable for receiving a first charge information from a first cell controller, receiving a second charge information from a second cell controller, ending a balancing instruction to the first cell controller to delivery power from a first battery cell to a second battery cell; monitoring the first charge information while the first battery cell is being charged from an external power source, determining if the first charge information is equal to or higher than a predetermined charge percentage, sending a cease charging instruction to a first cell controller when the first charge information is equal to or greater than a predetermined percentage; and, supplying power from an external power source to the charge set of battery cells and transferring power from the discharge set of battery cells to the external load contemporaneously.

17 Claims, 8 Drawing Sheets

Related U.S. Application Data which is a continuation of application No. 14/630,341, filed on Feb. 24, 2015, now Pat. No. 9,865,903.

(60) Provisional application No. 61/966,378, filed on Feb. 24, 2014.

(51) Int. Cl.

| | |
|---|---|
| *H02M 7/44* | (2006.01) |
| *H02S 40/32* | (2014.01) |
| *H02J 7/35* | (2006.01) |
| *H02S 30/20* | (2014.01) |
| *H02S 40/30* | (2014.01) |
| *H01M 10/44* | (2006.01) |
| *A45C 3/00* | (2006.01) |
| *H02S 10/40* | (2014.01) |
| *H02S 40/38* | (2014.01) |
| *H01M 10/42* | (2006.01) |
| *A45C 15/00* | (2006.01) |

(56) References Cited

U.S. PATENT DOCUMENTS

| | | | |
|---|---|---|---|
| 8,203,237 B1* | 6/2012 | Cowles | H02J 7/355 307/150 |
| 2005/0093514 A1 | 5/2005 | Shimizu | |
| 2008/0029153 A1 | 2/2008 | Margalit | |
| 2009/0027056 A1* | 1/2009 | Huang | B60L 58/12 324/439 |
| 2009/0127933 A1 | 5/2009 | Simanazzi | |
| 2011/0176256 A1 | 7/2011 | Van Straten | |
| 2012/0187761 A1* | 7/2012 | Yanagi | H01M 10/44 307/29 |
| 2012/0202094 A1* | 8/2012 | Sada | H02J 7/355 429/9 |
| 2012/0205975 A1* | 8/2012 | Takehara | G06F 1/189 307/23 |
| 2013/0328530 A1* | 12/2013 | Beaston | H01M 10/4207 320/128 |
| 2014/0079963 A1* | 3/2014 | Takeuchi | H02J 7/0016 429/52 |

\* cited by examiner

PORTABLE RENEWABLE ENERGY POWER SYSTEM

PRIORITY CLAIM

This application claims the benefit of U.S. patent application Ser. No. 15/829,465 filed on Dec. 1, 2017 which claims the benefit of U.S. patent application Ser. No. 14/630,341 filed on Feb. 24, 2015, which in turn claims priority on Provisional Patent Application Ser. No. 61/966,378 filed on Feb. 24, 2014, which are incorporated herein by reference in its entirety.

BACKGROUND

Various examples described herein are directed to portable renewable energy power systems and methods of operating the same.

FIGURES

Various examples are described herein in conjunction with the following figures, wherein.

DESCRIPTION

Various examples described herein are directed to portable renewable energy power systems (portable power systems) and methods of operating the same. Various portable power systems described herein may comprise a solar array-based battery charging system and a power inverter to generate outputs such as, for example, alternating current (AC). Portable power systems, as described herein, may be housed in a briefcase-type enclosure having dimensions like that of a briefcase. Various examples of portable power systems described herein may serve as power sources in remote locations or in back-up situations where the power supply must be portable, and/or if other power sources are not available.

Figure 1:
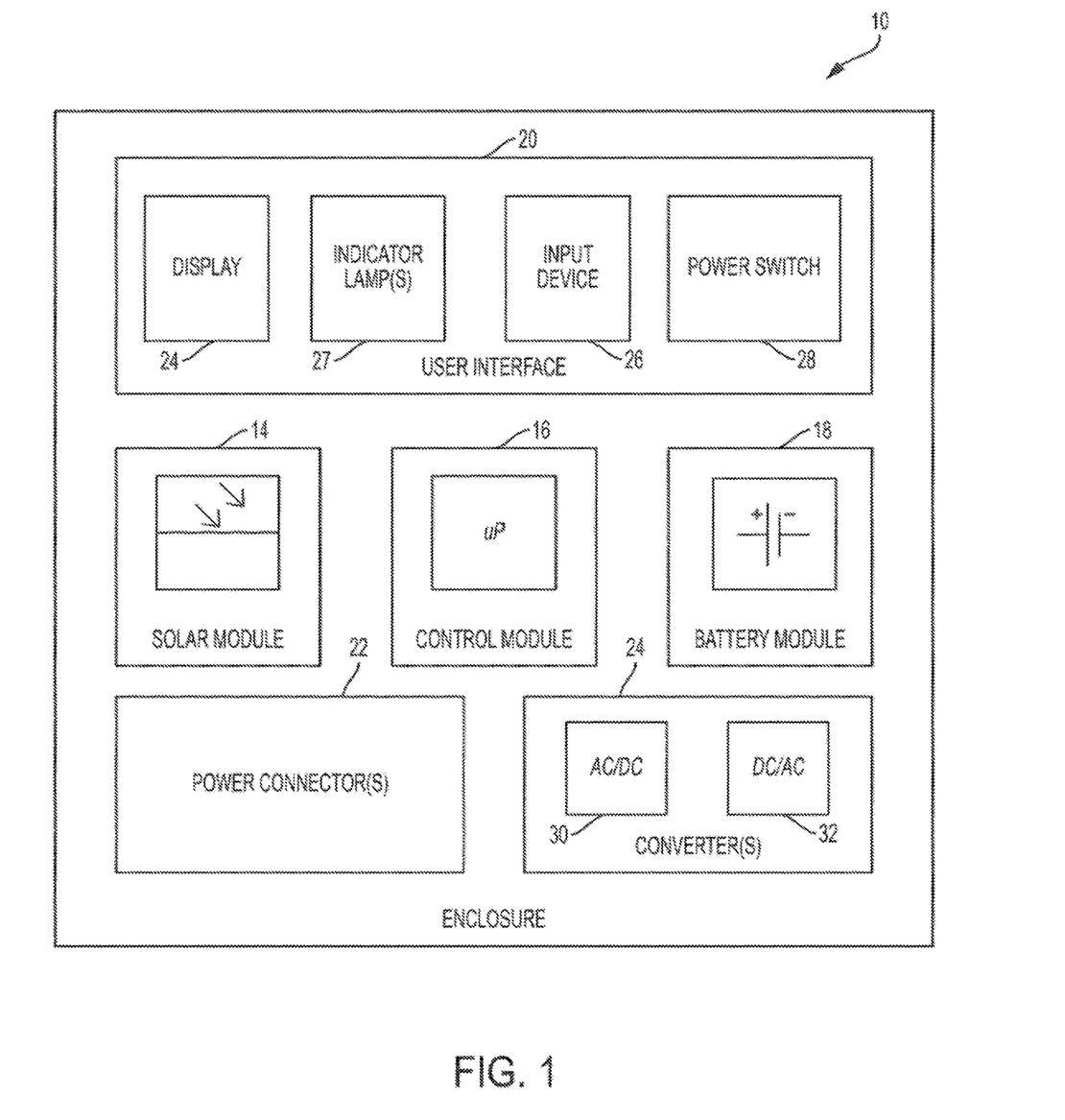
FIG. 1 is a block diagram showing one example of a portable power system.

FIG. 1 is a block diagram showing one example of a portable power system 10. The portable power system may comprise various components including, for example, a solar module 14, a battery module 18, a control module 16, a user interface module 20, one or more power connectors 22 and one or more converters 24. The modules 14, 16, 18, 20, 22, and 24 may positioned in an enclosure 12. In various examples, the various components of the portable power system 10 may be sized to enhance portability. For example, the enclosure 12 may have a size comparable to that of a briefcase or suitcase. The various components positioned in the enclosure 12 may be sized to fit within the enclosure, allowing the system 10 to be moved from place-to-place.

The solar module 14 may comprise any suitable type of photovoltaic cell or other device for converting solar energy into electricity. For example, the solar module 14 may comprise an array of photovoltaic cells. When the solar module 14 comprises photovoltaic cells, any suitable type of cell may be used including, for example, monocrystalline silicon solar cells, polycrystalline silicon solar cells, string ribbon solar cells, thin-film solar cells, amorphous silicon solar cells, cadmium telluride (CdTe) solar cells, copper indium gallium selenide (C1S/CIGS) solar cells, etc. In some examples, the solar module may comprise an array of photovoltaic cells configured to provide fifteen (15) Watts (W) of power at a maximum voltage of twenty-four (24) Volts. In some examples, the solar module may comprise an array of photovoltaic cells configured to provide about one hundred and fifty (150) W.

The battery module 18 may comprise one or more battery cells. The battery cells may be charged either from an external power source and/or by the solar module 14.

Battery cells included in the battery module 18 may be of any suitable type including, for example, lithium-ion cells, nickel-cadmium cells, lead-acid cells, etc. In some example, the battery module 18 may comprise four sealed lead acid battery cells connected in series. Each of the sealed lead acid battery cells may have a capacity of twelve (12) amp-hours and a voltage of six (6) Volts (V).

Converter module 24 may comprise one or more power converters 30 and 32 for converting power between alternating current (AC) and direct current (DC). An AC/DC converter 30 may convert alternating current to direct current. The AC/DC converter 30 may be configured to receive power from an external source (e.g., an electric outlet powered by the electric grid) and convert the received power to direct current for charging battery cells comprising the battery module 18. In this way, a user may plug-in the system 10 to charge the battery module 18. Any suitable AC/DC converter architecture may be used. In some examples, the AC/DC converter 30 may receive an input of between one hundred (100) and two-hundred and forty (240) Vat between fifty (50) Hertz (Hz) and sixty (60) Hz. The AC/DC converter 30 may provide a direct current output of between twelve (12) V and twenty-four (24) V, with a maximum output current of ten (10) V at two-hundred and forty (240) W. In some embodiments, the AC/DC converter 30 may be solid state, for example, the AC/DC converter 30 may not have any moving parts. The AC/DC converter 30 may be configured to maximize battery life and minimize heat generation. In some examples, the converter may comprise a processor configured to execute battery management software. The battery management software may be configured to enhance battery life by sampling and adjusting the power in and out. Any suitable sampling and/or adjusting rate may be used. In this way, heat and strain on the circuits of the system may be reduced.

The converter module 24 may also comprise a DC/AC converter 32. The DC/AC converter 32 may be configured to receive power from a DC source, such as the solar module 14 and/or the battery module 18 and convert the received power into an AC current that may be used by traditional devices designed for use on an AC power grid. The DC/AC converter 32 may receive an input of about twelve (12) V and provide an AC output of between one-hundred fifteen (115) V and two-hundred and forty (240) V at between fifty (50) Hertz (Hz) and sixty (60) Hz. In some examples, the maximum output power is one-hundred fifty (150) W.

Power connector module 22 may comprise various connectors for providing and receiving power. For example, the power connector module 22 may comprise a connector for connecting the system 10 to a standard power grid to receive power, for example, to charge battery cells of the battery module 18. The power connector module 22 may also comprise one or more connectors for connecting the system 10 to one or more devices to be powered by the system (e.g., from the battery module 18 and/or the solar module 14). In some examples, a single connector may be used to both provide power to the system 10 from a standard power grid and to provide power from the system 10 to one or more devices.

The user interface 20 may comprise various components allowing a user to interact with and configure the system 10. The user interface 20 may comprise one or more displays 24, one or more input devices 26, one or more indicator lamps 27, and one or more power switches 28. The display 24 may comprise any suitable type of display including, for example, a display screen, a speaker, etc. The input device 26 may comprise any suitable device for providing input to the system including, for example, a keypad, a pointing device such as a mouse or touchpad, embedded membrane switches, etc. In some examples, the user interface 20 may comprise a touch screen that forms all or part of the display(s) 24 and all or part of the input device(s). In some examples, a touchpad may comprise a 1.7-inch diagonal liquid crystal display (LCD) integrated with an overlaid touch sensor and polyester overlay. Indicator lamps 27 may include lamps such as light emitting diodes (LEDs) or other suitable lamps. For example, indicator lamps 27 may indicate a mode or configuration of the system 10. The power switch 28 may be actuatable to turn the system 10 on and/or off.

The control module 16 may comprise one or more microprocessors and/or other control components configured to control the operation of the system 10. Any suitable microprocessor may be used. In some examples, the control module 16 may utilize a CORTEX M-3 microprocessor available from ARM. In some examples, the control module 16 may utilize an embedded microcontroller architecture. The control module 16 may be programmed to configure and monitor functional states of the system 10, monitor the condition of the battery module 18, and provide a graphical user interface (GUI) via the components of user interface 20. In some examples, the control module 16 may utilize one or more relays, transistors, or other switching elements to change the configuration or functional state of the system, for example, by changing the connectivity between the various components of the system 10. The system 10 may comprise various configurations or functional states that may be set by the control module 16, for example, in response to input received via the user interface 20.

According to an external charge configuration, the control module 16 may configure the system 10 to receive an AC signal via a power connector 22, convert the AC signal to a DC signal utilizing the AC/DC converter 30, and provide the DC signal to the battery module 18 to charge the battery cells. According to an internal charge configuration, the control module 16 may configure the system to route a DC signal generated by the solar module 14 to the battery module 18 to charge the battery cells. In some examples, the control system and/or the converter module 24 may comprise components for performing suitable AC/DC conversion to the DC signal generated by the solar module 14 to make it suitable for charging the battery module 18. According to a hybrid power configuration, the control module 16 may configure the system 10 to provide power to an external load (e.g., via power connector 22) from the solar module 14 and/or the battery module 18. For example, in the hybrid power configuration, the external load may be driven by the solar module 14 if it is providing enough power to drive the load (e.g., if the solar cells are deployed and, in enough sunlight,). If the solar module 14 does not provide enough power to drive the load, it may be supplemented by the battery module 18. According to a battery-only configuration, the control module 16 may configure the system 10 to provide power to the load from the battery only. According to a solar-only configuration, the control module 16 may configure the system 10 to provide power from the solar module 14 only. In some examples, the control module 16 may configure the system 10 to allow the solar module 14 to charge the battery module 18 while the system 10 is powering a load. For example, in the solar-only configuration and hybrid power configuration, the control module 16 may configure the system 10 such that solar power (if any) above what is needed to drive the load is provided to charge the battery module 18. In the battery-only mode, any power generated by the solar module 14 may be provided to charge the battery module 18.

The enclosure 12 may be made from any suitable material including, for example, plastic or plastic alloy components. For example, the enclosure 12 may comprise components made from injection-molded acrylonitrile butadiene styrene (ABS) or a suitable alloy thereof. In some examples, tooling may be developed for each plastic component. In some examples, the enclosure 12 may be made from a material that is impervious to deteriorative elements that are expected to be encountered during normal use such as, for example, outer elements such as snow, wind, and rain, knocks and bumps as users carry the system 10 from place to place, etc. In some examples, the enclosure 12 may be designed to support operational integrity and ergonomic factors in multiple orientations, as described herein.

Figure 2:
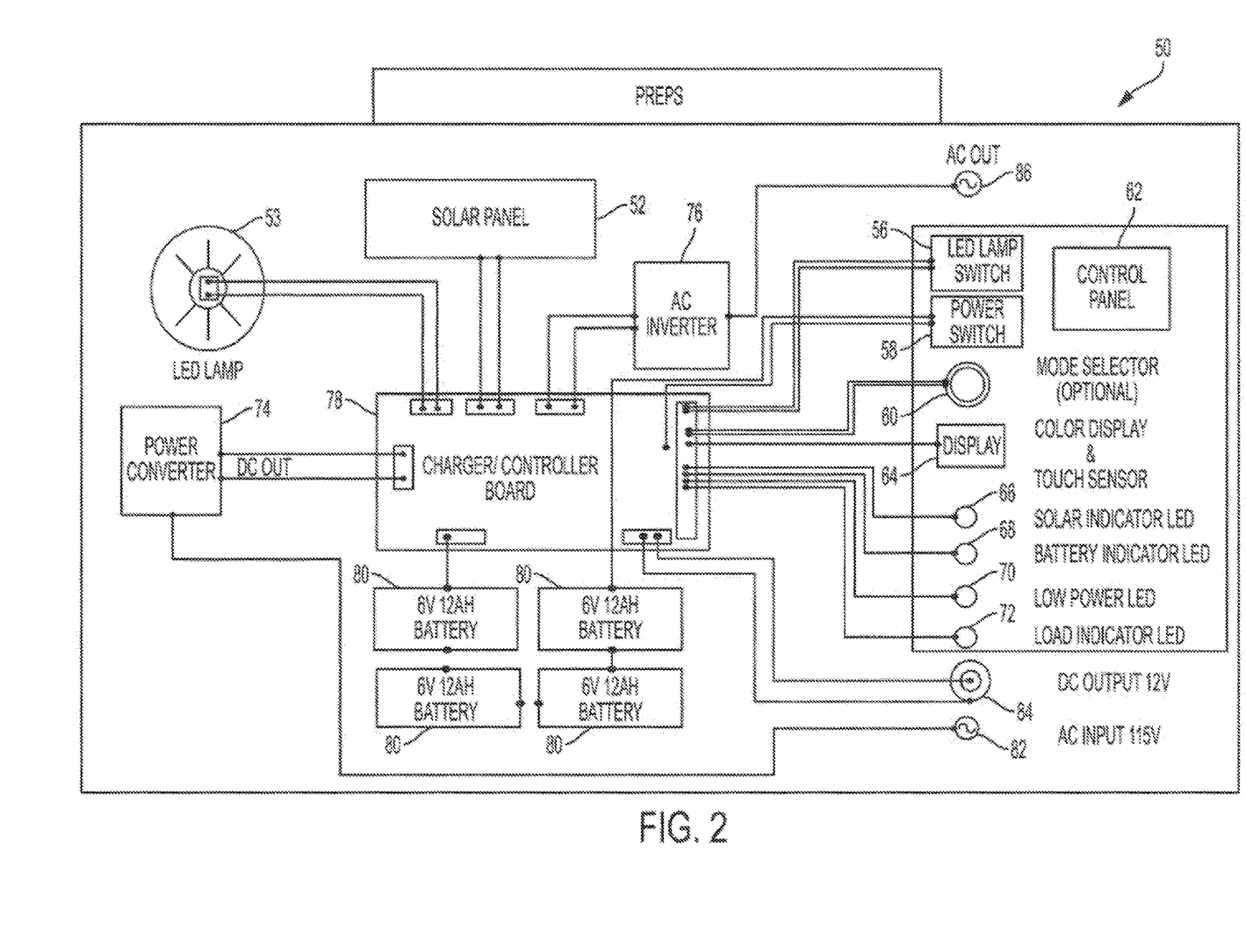
FIG. 2 is a block diagram showing another example of a portable power system.

FIG. 2 is a block diagram showing another example of a portable power system 50. In some examples, the portable power system 50 is an implementation of the system 10 described herein above. The system may comprise one or more solar panels 52, for example, part of the solar module 14 described above. The system 50 may additionally comprise a charger/controller board 78. For example, the charger/controller board 78 may comprise components for implementing the control module 16 including, for example, one or more microprocessors, microcontrollers, digital signal processors (DSPs), etc. The charger/controller board 78 may be in communication with batteries 80, which may make up all or part of the battery module 18. The charger controller board 78 may additionally be in communication with an AC/DC power converter 74 and a DC/AC converter or AC inverter 76. The power converter 74 may be connected to receive an AC input 82 and provide a DC output. The DC output may be connected by the charger/controller board 78 to charge the batteries 80 and/or may be connected to a DC output port 84, for example, to power devices configured to operate on a DC rail, such as twelve (12) V. The AC inverter 76 may be connected to receive a DC signal (e.g., from the power converter 74 and/or the solar panel 52). The DC signal may be provided to an AC out port 86. For example, the AC out port 86, the DC out port 84, and the AC input port 82 may be part of the power connector module 22 described herein.

In some examples, the system 50 further comprise an LED lamp 53, which may provide light to users configuring the device. A control panel 62 may comprise components making up the user interface 20 described herein above. For example, the control panel may comprise an LED lamp switch 56, which may be operative to light and extinguish the LED lamp 53. A power switch 58 may turn power to the system 50 on and off. A mode selector 60 may comprise a rotary or other switch allowing a user to select a configuration for the system 50. The display 64 may comprise an LCD touchscreen, as described above. A solar indicator LED or other lamp 66 may be programmed to light when the solar panel 52 is generating an electric signal. A battery indicator LED or other lamp may be programmed to light when the battery has reached a predetermined state (e.g., fully charged, nearly discharged, etc.). A low power LED 70 may be programmed to light when the system 50 is not capable of delivering its indicated power. A load indicator LED 72 may be configured to light when a load is present (e.g., across the AC output 86).

Figure 3:
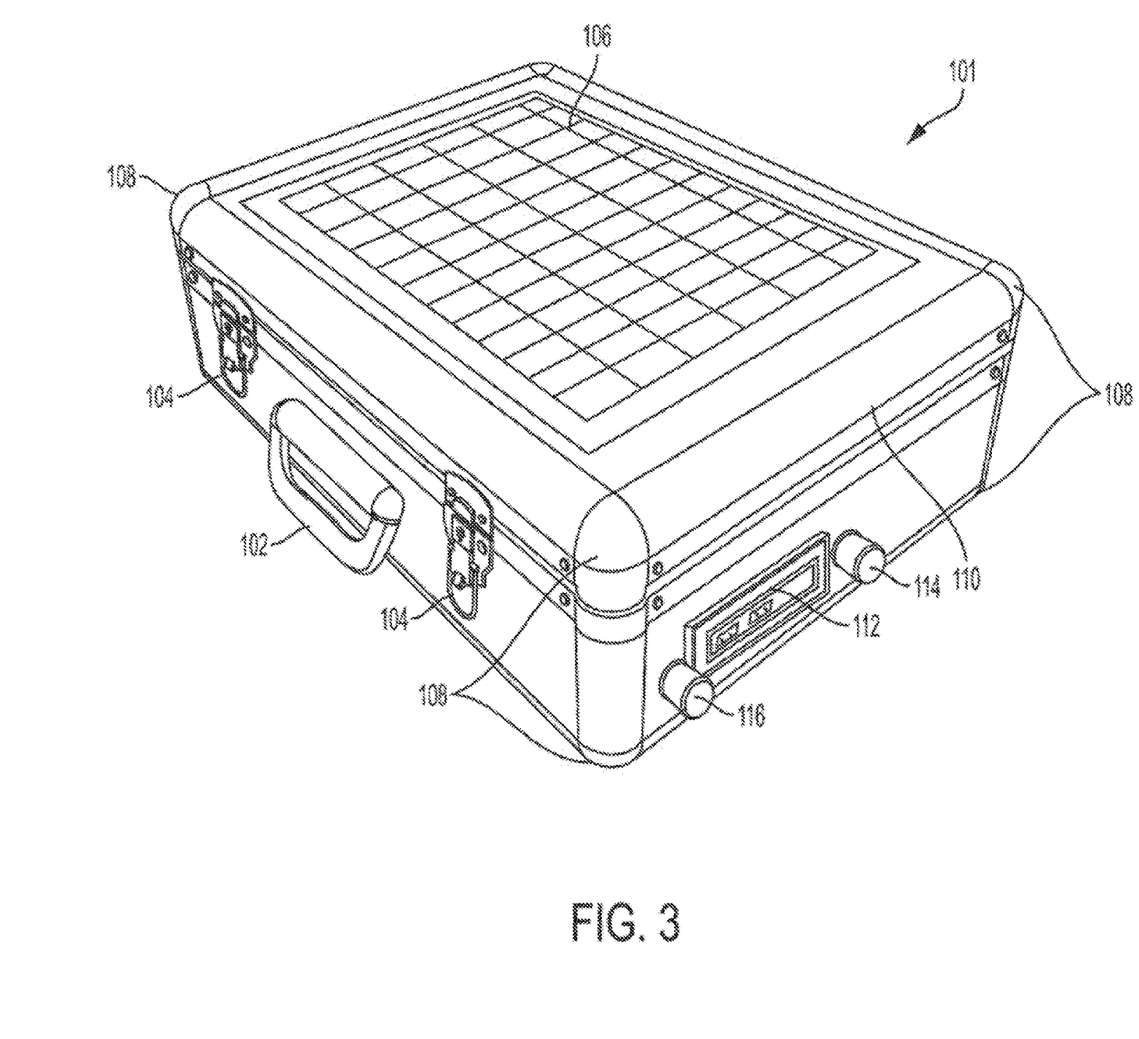
FIG. 3 is a diagram showing another example of a portable power system positioned in an example enclosure.

FIG. 3 is a diagram showing one example of a portable power system 100 positioned in an example enclosure 101. The enclosure 101 may be made of any suitable material, for example, as described herein. In various examples, the enclosure 101 may comprise a handle 102 allowing the system 100 to be lifted and transported, for example, by a single human user. The example enclosure 101 may open along a seam 110. In some examples, components making up the user interface 20 are positioned inside the enclosure 101, for example, to provide protection from the elements. Latches 104 may secure the enclosure 101 in the closed position that is shown. In some examples, the enclosure 101 may be made from a plastic, as described, with corner guards 108 made from a metal, such as steel. The enclosure 101 shown in FIG. 3 comprises an externally positioned solar panel 106. Input knobs 116, 114 and a touch screen 112 may provide input and output capabilities for controlling the system 100.

Figure 4:
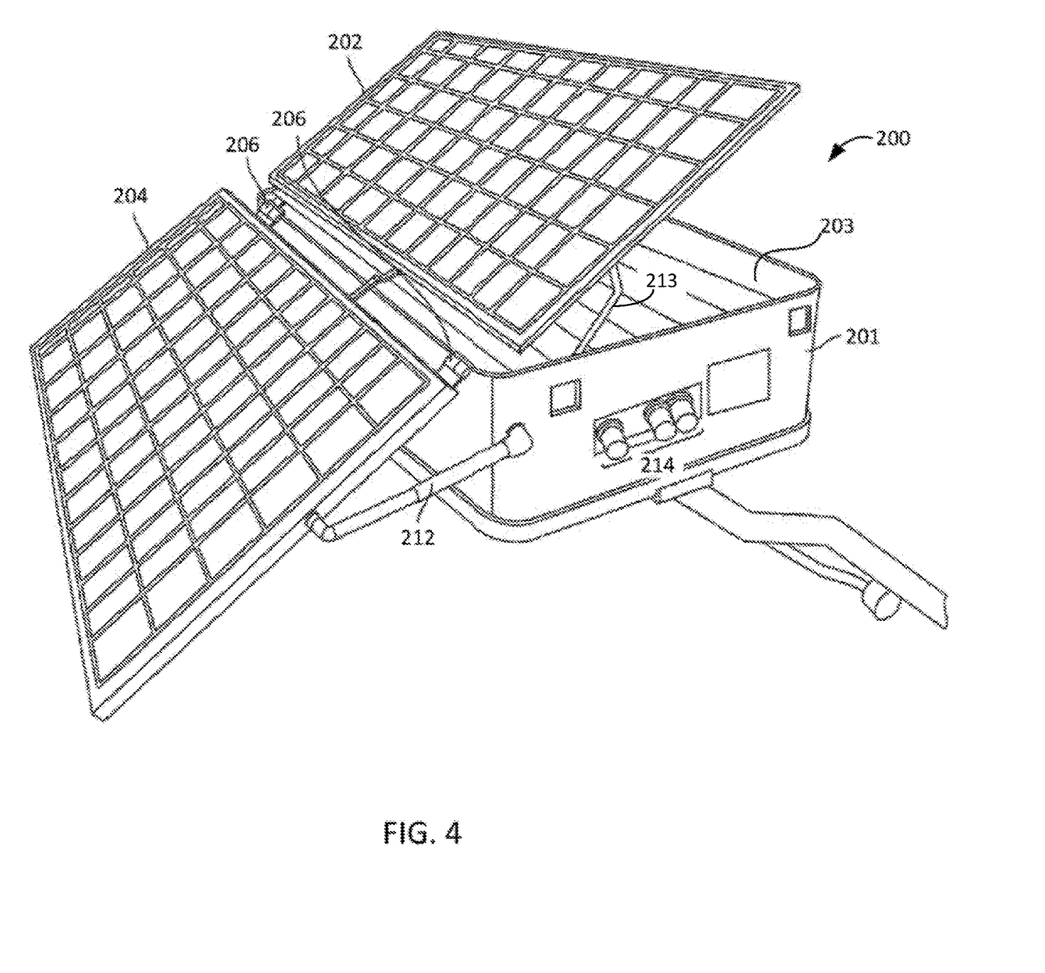
FIG. 4 is a diagram showing an example of an enclosure comprising deployable solar panels.

FIG. 4 is a diagram showing an example of an enclosure 201 comprising deployable solar panels 202, 204. The enclosure 201 is shown in an open position with the solar panels 202, 204, deployed. An extendable strut 212 may support the panel 204 as shown. The panels may be un-deployed by folding panel 204 onto panel 202 along hinges 206. The two panels may be folded over a remainder of the enclosure 201 to transition to a closed state with the panels 202, 204 positioned inside the enclosure 201. The strut 212 may be retracted as the panels 204, 206 are un-deployed. Display lamps 214 are also positioned on an exterior of the enclosure 201. In one embodiment, the strut can be external to the enclosure as shown by 212. In one embodiment, the strut can be carried internal to the enclosure as shown 213.

Figure 5:
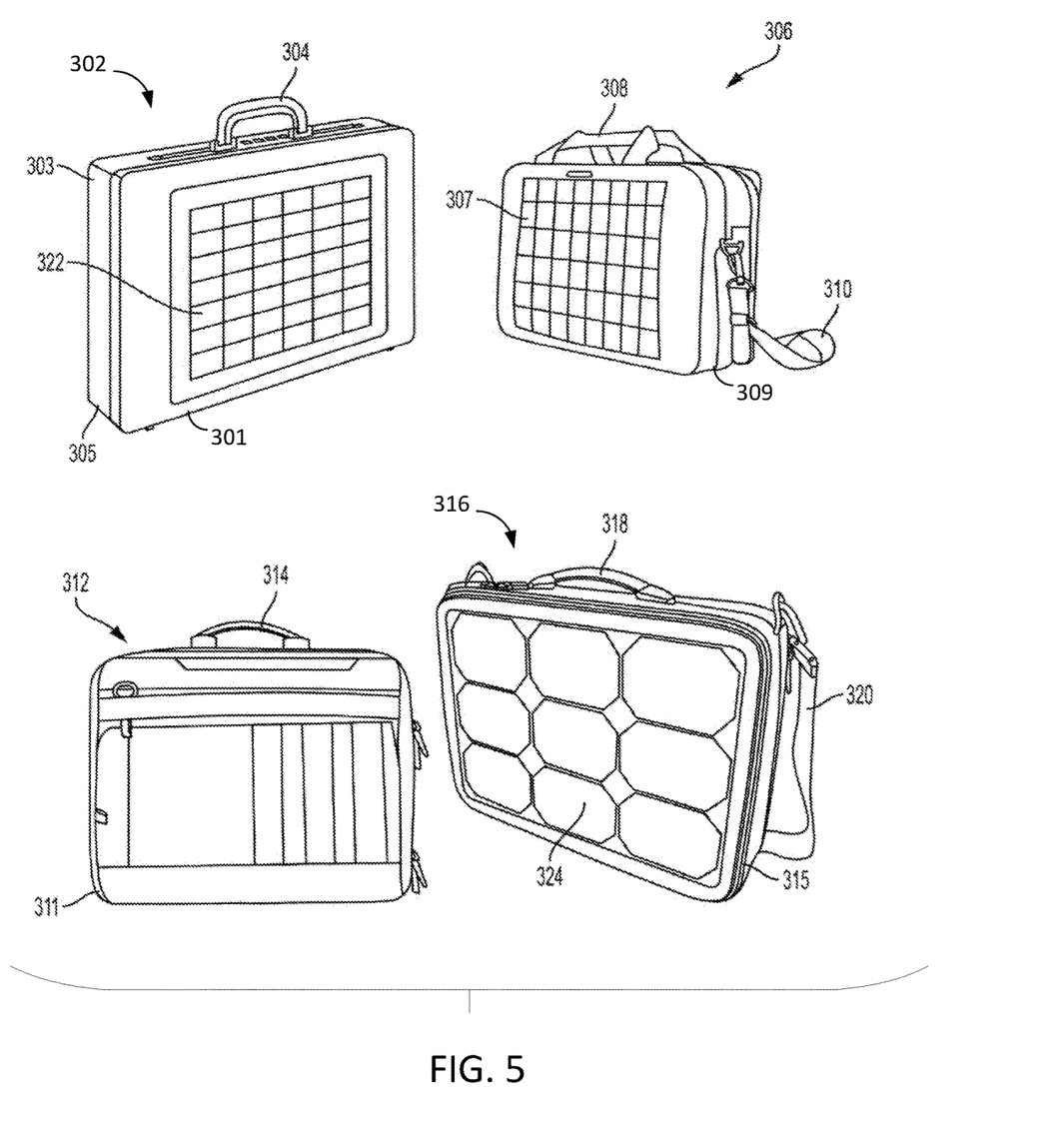
FIG. 5 shows diagrams of various examples of enclosures that may be utilized with portable power systems.

FIG. 5 shows diagrams of various examples of enclosures that may be utilized with portable renewable energy power systems. An enclosure 302 may comprise a hard-shell material (e.g., plastic, metal, or other suitable material), have a first side 303, a second side 301, and may be hinged to open along hinge 305. The enclosure 302 also comprises a handle 304 for carrying. A solar panel 322 comprising an array of solar cells may be positioned on an exterior portion of the enclosure. An enclosure 306 may be made from a soft nylon material. The enclosure 306 may comprise an external solar panel 307 and may hinge about hinge 309. In some examples, the enclosure 306 may be secured in the closed position by a zipper or other suitable fastener. The enclosure 306 may be usable in multiple orientations. For example, a user may transport the enclosure 306 by grasping handles 308. In some examples, the user may also transport the enclosure 306 utilizing the handle strap 310. The enclosure 312 may hinge about hinge 311 and may comprise a handle 314 for carrying. The enclosure 316 may also hinge about a hinge 315 and may comprise a handle 318 and carrying strap 320. The enclosure 316 may additionally comprise an exterior solar panel 324.

In some examples, multiple portable power systems may be connected in parallel and/or series to act as a single power system. For example, power systems may be connected in series to increase the available voltage output. Power systems may be connected in parallel, for example, to increase the available current and power output. Each power system may be configurable by its control module 16 for multi-unit connection.

In various examples, components of portable power systems described herein may be selected such that the portable power systems meet certain operating parameters. Some examples of portable power systems may be configured to operate between −30° and 70° C. and to tolerate storage at temperatures between −40° and 85° C. Some examples of portable power systems may be configured to operate and be stored at humidity levels between 10% and 95%. Some examples of portable power systems may be configured to operate between 0 and 10,000 feet and be stored between 0 and 40,000 feet. Some examples of portable power systems may be configured to operate through vibrations of 20 Hz to 50 Hz, 10 meters/second$^2$, 0.5 oct/min, along 3 axes. Some examples of portable power systems may be configured to have a shock resistance of at least 294 meters/second$^2$. Some examples of portable power systems may be configured to meet International Protection Specification IP65. Some examples of portable power systems may be configured to meet EN 55022/FCC Class A (Class B targeted) standards for radio disturbance characteristics for information technology equipment. Some examples of portable power systems may be configured to meet EN 55024 immunity characteristics and limits for information technology equipment. Some examples of portable power systems may be configured to be compliant with RoHS environmental regulations.

Figure 6:
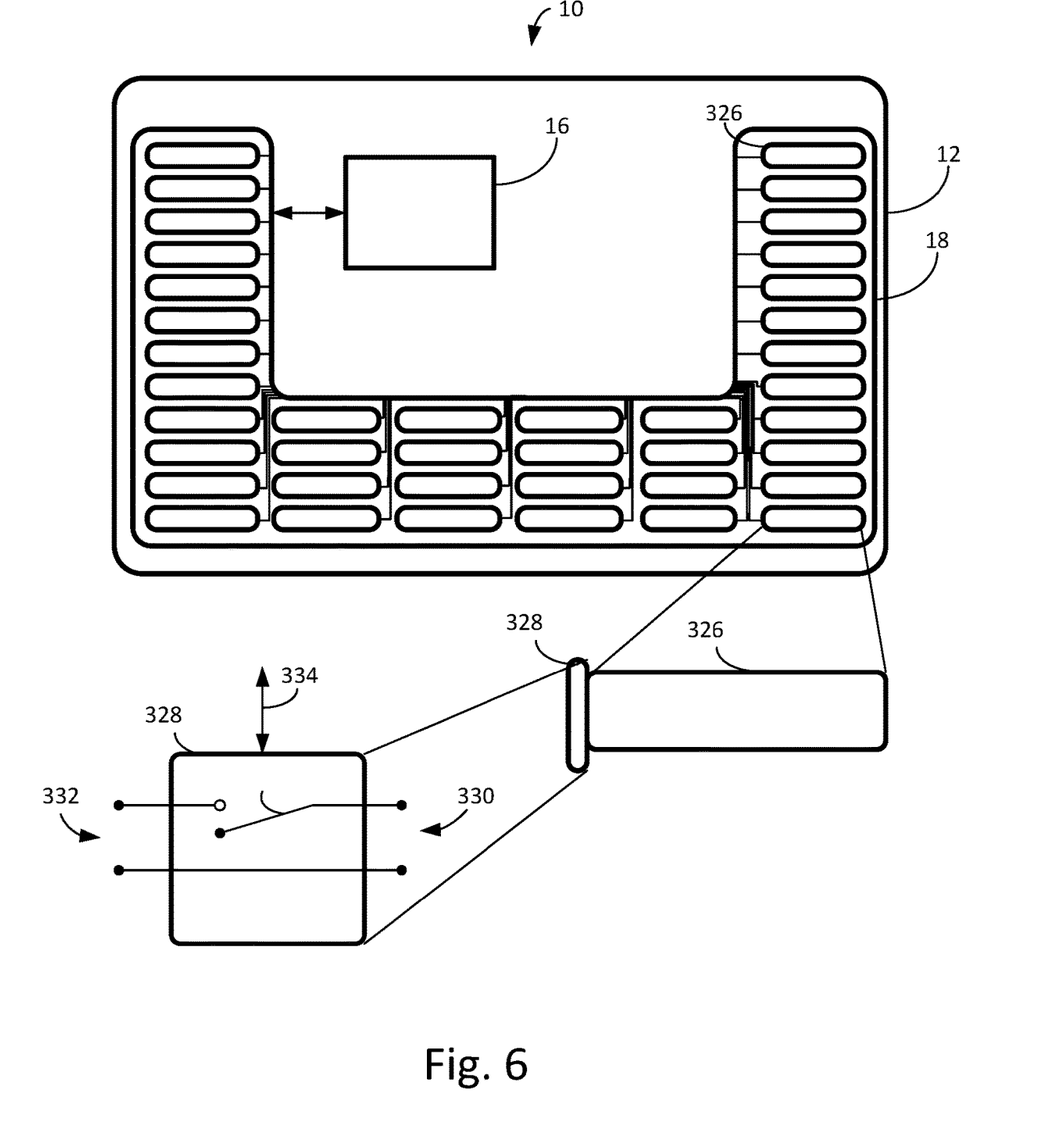
FIG. 6 shows a schematic of various components of the portable power system.

Referring to FIG. 6, portable power system 10 can include an enclosure 12 for housing a battery module 18. Battery cells, such as 326, can be included in the battery module and can define a set of battery cells disposed within the enclosure. The battery cells can be connected in series or parallel or both or can be placed in a combination of configurations with cell controllers 328 or control module 16. In one embodiment, the battery cells can be arranged along the side and bottom perimeter of the enclosure to advantageously balance the weight of the enclosure. Each battery cell can be associated with a cell controller 328 that can be connected to the battery or affixed to the battery. In one embodiment, the cell controller is affixed to the battery cell and can be affixed to the negative terminate of the battery cell. The cell controller can include positive and negative cell power leads 330 to the battery cell, positive and negative control module power leads 332 to power connectors or converters, cell data connection 334 to the control module, cell controller computer readable memory and cell computer readable instructions. The cell controller computer readable memory can be non-volatile computer memory such as an EPROM. Each battery cell and/or cell controller can be independently connected to the control module so that power can be delivered to a load or from a charging source independently as can be determined by the control module. Control module computer readable instructions can determine how to route power and from which one of the battery cells to use. Each battery cell and/or cell controller can have an independent data connection to the control module so that information can be transmitted to and from the cell controller independently for each battery cell.

Each cell controller can include a cell switch 331 which can allow power to flow between each battery cell to the control module, power connector or convertor when closed or prevent power from flowing between the battery cell and the control module, power connector or convertor when open. The cell switch can be controlled by the cell computer readable instructions which can be directed by the control module computer readable instructions. The control module can include a control module computer readable memory and control module computer readable instructions. The control module computer readable memory can be non-volatile computer memory such as an EPROM.

The cell controller can include a charge sensor such as a resistor that can be placed in series with the battery cell to measure the charge of the battery cell so that the cell computer readable instructions can retrieve or are provided the charge of the battery cell. The voltage drop across the resistor is proportional to the charge current so that when the battery cell is close to fully charged, the current would approach 0 mA. The cell computer readable instructions can provide charge information for each battery cell to the control module independently of the other battery cells. The control module can then balance the charge across the battery cells resulting in prolonged battery cell life, more consistent charging and discharging and reduced heat from the battery cells.

To overcome the disadvantage that a battery cells can increase as the battery cell is fully charged, one embodiment includes the control module communicating with a cell controller or battery cell and detects if the battery cell hits a predetermined charge percentage. The control module or cell controller can discontinue power delivery to the battery cell to stop charging. The predetermined percentage can be a percentage less than 100%, less than 95%, less than 90% and can include when the battery cell is about 95%, 90%, 85%, or 80% charged. This predetermined percent can be associated with the status of full for each battery cell. If each battery cell is charged to its 90% of its actual capacity, for example, the control module can report that the battery module is 100% charged. This scaling of the battery charge can increase battery cell life, reduce unnecessary heating and improve safety. The control module computer readable instructions can send a cease charging instruction to one or more cell controller to prevent the battery cell from being charged above this predetermined amount or percentage In one embodiment, the control module includes a cell controller for each battery cell in the battery module. Each battery cell is then attached to its respective cell controller of the control module. The control module computer readable instructions can control the control module and the cell controller.

In one embodiment, the control module computer readable instructions can determine if balancing of power across the battery cells is needed on a predetermined schedule such as every few hours, daily, weekly, monthly or other interval. This determination can also be made when one or more battery cells are charged or discharged. The control module computer readable instructions can send a balancing instruction to one or more cell controller to allow balancing of charge between the various battery cells in the battery module.

The control module computer readable instructions can include instructions to balance the charge among the various battery cells of the battery module. The control module can determine the charge of each battery cell and distribute power from one battery cell to another battery cell. The control module computer readable instructions can also determine when a battery cell was more recently charged or discharged. Power can be transferred from a charged battery cell to a less charged battery by opening the cell switch for the two battery cells and allowing the charges to flow to the less charged battery cell. For example, the control module computer readable instructions can determine that a first battery is charged at or above 90% and a second battery cell is lower than 50%. The control module can open the respective switches between the first battery cell and the second battery cell allowing power to flow from the first battery cell to the second battery cell till the second battery cell is charged to a predetermine charge percentage.

In one embodiment, the battery cells can be segmented into a charge set and a discharge set. The charge set can be charged from external power source such as AC or DC sources including integrated or external solar panels. This charge set can then be used to transfer power from the charge set to the discharge set. The discharge set can be in electrical communications with various external loads connected to the power connector and provide power to such external loads.

Figure 7:
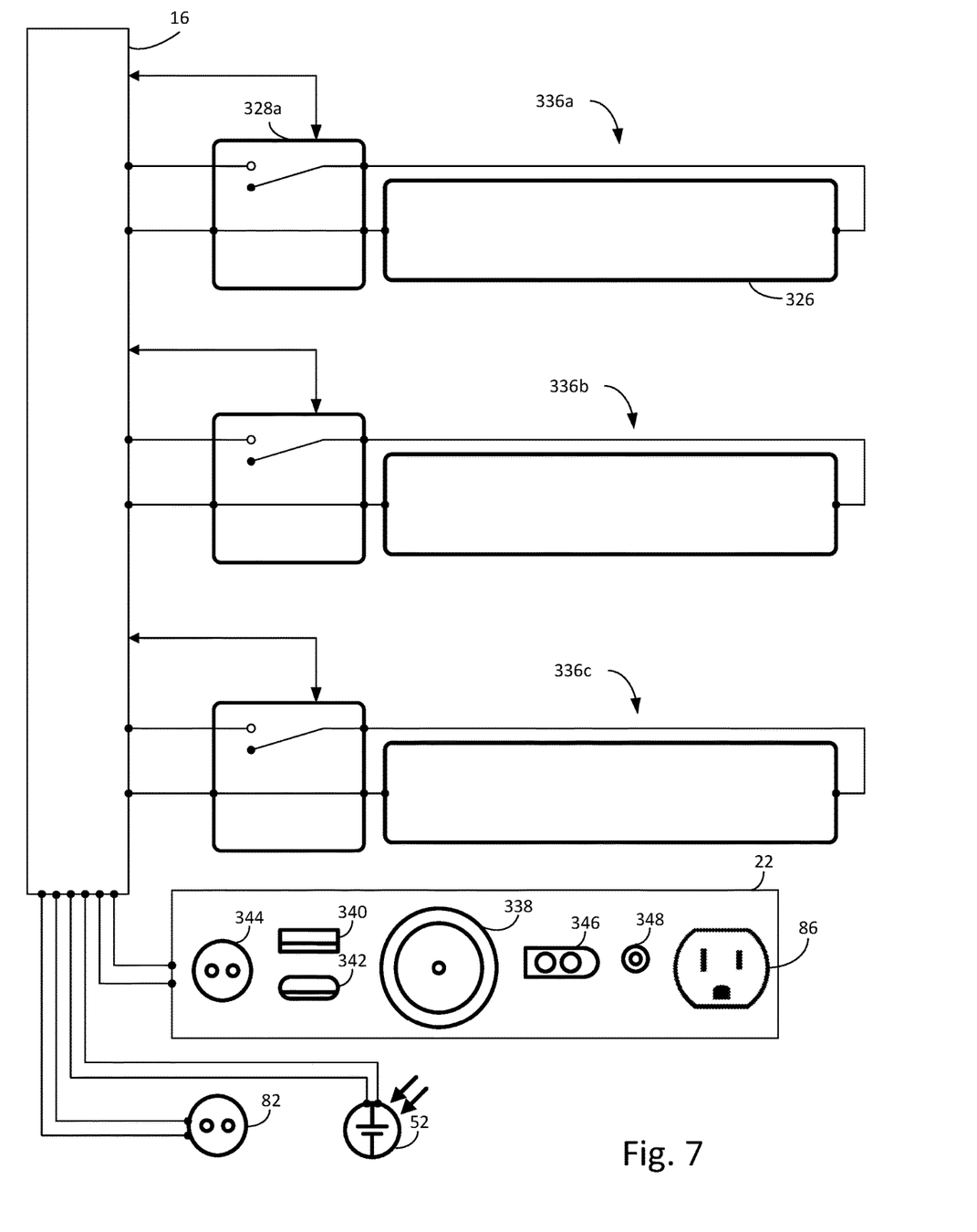
FIG. 7 shows a schematic of various components of the portable power system.

Referring to FIG. 7, battery cell assembly 336a includes a battery cell 326a and cell controller 328a. Additionally battery assemblies 336b and 336c are shown connected to the control module 16. The controller module can determine that a battery cell such as 336a needs charging and can then determine is an external power source is available such as through a solar module 52 or external AC power 82. If so, the control module can direct power from these power sources to battery cell 336a. Battery cell 336a can be included in the charge set. The control module can determine is battery cell 336b needs charging and if so, direct power from battery cell 336a to battery cell 336b. Battery cell 336b can be included in the discharge set. When an external load is connected to an output, the external load can be powered from the battery cell 336b. If the external load needs additional power or one or more battery cells such as 336c from the discharge set can be used to power the external load. The battery cells in the charge set can be charged from an external source contemporaneously when an external load is being powered by the discharge set without performance degradation or excessive heat generated when charging and discharging the battery module. One or more external loads can be attached to the power connector 22 and can include one or more power outlets such as an AC outlet 86, car charger port, USB port 340, USB-C 342, pin connector 344 or 346, DC plug 348, BA2590 connector or another AC or DC power outlet. On-off switches can be associated with each power outlet in one embodiment. The control module can also determine which battery cell or battery cell combinations to use to provide power to which power outlet.

The control module computer readable instructions can determine the power needs of the external load and discharge one or more battery cells to the external load based upon the power requirements of the external load. The external load requirements can be determined by supplying a first amount of power from a first battery cell or first set of battery cells to the external load, determining a first power draw of the external load, supplying a second amount of power from a second battery cell or second set of battery cells to the external load, determining a second power draw of the external load, comparing the first power draw to the second power draw and if the second power draw is generally higher to the first power draw, removing the supply of power from the second battery cell or second set of battery cells. By way of example, 5 Watts can be supplied to an external load using one or more battery cells, the first power draw can then be determined, 10 Watts can then be supplied to the external load using one or more additional battery cells and a second draw can be determined. 20 Watts can then be supplied to the external load using one or more further additional battery cells and a third draw can be determined. If the third power draw is the generally equal to the second power draw, then 10 Watts is all that is needed for the external load. This results in a preferred power output to the external load based upon the power needs of the external device which can prolong a battery cell operational life, reduce the interval between recharging of battery cells and prolong the utility of the battery module. The control module can perform this process for determining preferred power output for each external load attached to any output port independently of any other connected external load.

The external load requirements can be determined by the control module when the control module queries the external load and receive device type information. For example, an external load connected to a USB port can transmit the USB device descriptor to the control module. The control module computer readable instructions can then use a lookup table to retrieve power requirements for the specific device for a specific charging time. For example, a first USB device may require 5 Watts to fully charge the device in two to three hours. A second USB device may require 10 Watts to fully charge the device in two to three hours. The control module can select one or more battery cells to provide the needed power to the specific device based upon that device's needs. The external load requirements can be approximated by the control module when the control module determines the electrical resistance of the external device and can use a lookup table to determine power needs of that external load.

The control module computer readable instructions can send a discharge instruction to one or more cell controller to cause the battery cell to supply power to the external load or device connected to the outlet.

Figure 8:
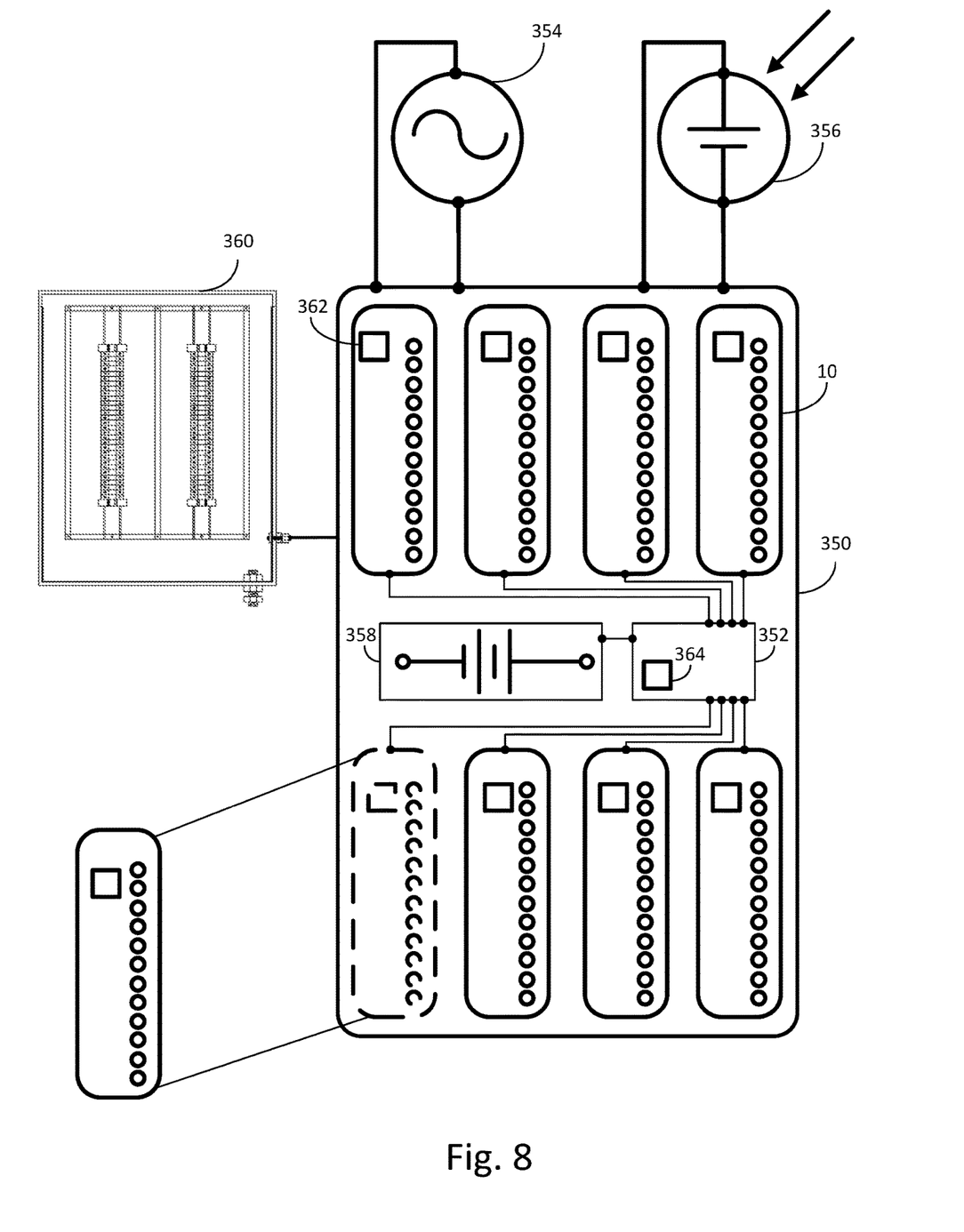
FIG. 8 shows a diagram of various components of a collection of portable power systems.

Referring to FIG. 8, each portable power system 10 can be placed in a collective 350 that can be electrically connected to each portable power system in the collective. The collective can be a unit that can be placed in a building such as in a utility closet or other location. Each portable power system can be independently connected to a collective control module 352 that include collective computer readable instructions. The collective can be connected to external power sources such as external AC power 354 or solar power 356. The solar power can be from a solar array that can be rooftop mounted on a building that holds the collective. The collective control module can determine which portable power system needs a charge and can supply power to that portable power system. In one embodiment, the collective control module can determine which portable power system needs a charge and supply power to that portable power system from a collective battery 358. The collective battery can be charged from the external power such as AC power or solar power. The collective can be connected to an electrical panel 360 and can supply power to an external load including a building in the event of a power outage. Multiple collectives can be connected to increase the amounts of power that can be provided to an external load allowing one or more collectives to supply a building having varying power needs. Each portable power system in the collective can be hot-swapped in and out of the collective, for example, portable power system 10a can be removed from the collective. When a portable power system is inserted, the collective control module can determine if the portable power system needs to be charged and charge the portable power system. The collective can include AC or DC power outputs. The collective can also be connected to the power grid to provide power back to the grid. The portable power system can include a data connection in for connection to the collective module such as a RJ-45 connection or other wired or wireless connection.

In one embodiment, one or more portable power systems in the collective can be designated a collective charge set that are charged from the external power source. The collective charge set can be used to charge the remaining portable power systems so that the collective can be charged contemporaneously while supplying power to an externa load. In one embodiment, the collective charge set is not hot-swappable.

In one embodiment, the portable power supply includes a portable power system transceiver 362 that can communicate with a collective transceiver 364. The collective control module can receive charge information, temperature information, discharge information, operational information, history information, or other status information concerning a portable power supply that has been removed from the collective. The collective module can transmit status information to a computer device, such as a smart phone, informing the user that a first portable power system needs attention, charging, replacement or the like. The user can remove a second portable power system from the collective, replace first portable power system with the second portable port system, and return the first portable power system to the collective for charging and other actions. The portable power system can also transmit among themselves and act as repeated to increate transmission distance and the communications network between the portable power system and the collective. In one embodiment, the portable system power transceiver can operate on a operate on a wireless network such as a cellular network and can be operatively associated with a speaker and microphone allowing communications between the portable power system to advantageously provide communications capabilities in the event of infrastructure power loss.

Reference in the specification to, "examples," "various examples," "some examples," etc. means that a feature, structure, or characteristic described in connection with the examples is included in at least one example of the invention. The appearances of the above-referenced phrases in various places in the specification are not necessarily all referring to the same example. Reference to examples is intended to disclose examples, rather than limit the claimed invention. While the invention has been particularly shown and described with reference to several examples, it will be understood by persons skilled in the relevant art that various changes in form and details can be made therein without departing from the spirit and scope of the invention.

It should be noted that the language used in the specification has been principally selected for readability and instructional purposes and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as, for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as, for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It can be appreciated that, in some examples of the present methods and systems disclosed herein, a single component can be replaced by multiple components, and multiple components replaced by a single component, to perform a given command or commands.

Except where such substitution would not be operative to practice the present methods and systems, such substitution is within the scope of the present disclosure. Examples presented herein, including operational examples, are intended to illustrate potential implementations of the present method and system examples. It can be appreciated that such examples are intended primarily for purposes of illustration. No aspect or aspects of the example method, product, computer-readable media, and/or system examples described herein are intended to limit the scope of the present disclosure.

It will be appreciated that the various components of the environment 100 may be and/or be executed by any suitable type of computing device including, for example, desktop computers, laptop computers, mobile phones, palm top computers, personal digital assistants (PDA's), etc. As used herein, a "computer," "computer system," "computer device," or "computing device," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote, or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of a method. It should be noted that the process steps and instructions of the present disclosure can be embodied in software, firmware or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a programming language, the present disclosure is not limited to any programming language. It will be appreciated that a variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

What is claimed is:

1. A portable power system comprising:
an enclosure;
a control module disposed in the enclosure having a control module computer readable medium; a solar panel attached to the enclosure and in communications with the control module; a set of battery cells in communication with the control module wherein each battery cell is connected to a unique cell controller and each cell controller includes a charge sensor and a cell switch;
a power outlet in communications with the control module configured to provide power to an external load; a set of control module computer readable instructions included in a controller computer readable medium for receiving a first charge information from a first cell controller, receiving a second charge information from a second cell controller, determining if the first charge information is higher than the second charge information, sending a balancing instruction to the first cell controller to delivery power from a first battery cell to a second battery cell;
monitoring the first charge information while the first battery cell is being charged from an external power source, determining if the first charge information is equal to or higher than a predetermined charge percentage, sending a cease charging instruction to the first cell controller when the first charge information is equal to or greater than said predetermined charge percentage;
determining a device type connected to the power outlet, determining the power requirements for the device type; determining a combination of battery cells needed to supply power according to the device type, sending a discharge instruction to the combination of battery cells to direct power to the power outlet according to the power requirements for the device type; and,
supplying a first amount of power from said first battery cell to the device type, determining a first power draw of the external load, supplying a second amount of power from said second battery cell to the device type, determining a second power draw of the external load, comparing the first power draw to the second power draw and if the second power draw is equal to or greater than the first power draw, removing the supply of power from the second battery cell to the device type.

2. The portable power system of claim 1 including a discharge set of battery cells including in the battery module and a charge set of battery cells in the battery module.

3. The portable power system of claim 2 wherein the set of control module computer readable instructions including instructions for supplying power from an said external power source to the charge set and transferring power from the charge set to the discharge set.

4. The portable power system of claim 1, wherein the set of control module computer readable instructions including instructions for supplying power from said external power source to the charge set and transferring power from the charge set to the discharge set contemporaneously.

5. The portable power system of claim 1 wherein the power outlet is selected from the group consisting of an AC outlet, DC outlet, car charger port, USB port, USB-C port, pin connector, DC plug BA2590 connector or some combination thereof.

6. The portable power system of claim 1 including a transceiver configured to transmit status information about the portable power system to a remote computer device.

7. The portable power system of claim 1 wherein the solar panel is an external solar panel.

8. A portable power system comprising:
an enclosure;
a control module disposed in the enclosure having a control module computer readable medium;
a set of battery cells in communication with the control module wherein each battery cell is connected to a cell controller;
a charge set included in the set of battery calls;
a discharge set included in the set of battery cells;
a power outlet in communications with the control module configured to provide power to an external load;
a set of control module computer readable instructions included in the controller computer readable medium for
receiving a first charge information from a first cell controller, receiving a second charge information from a second cell controller, determining if the first charge information is higher than the second charge information, sending a balancing instruction to the first cell controller to delivery power from a first battery cell to a second battery cell;
monitoring the first charge information while the first battery cell is being charged from an external power source, determining if the first charge information is equal to or higher than a predetermined charge percentage, sending a cease charging instruction to the first cell controller when the first charge information is equal to or greater than said predetermined charge percentage;
supplying power from said external power source to the charging set and transferring power from the charge set to the discharge set contemporaneously;
supplying power from the discharge set to said external load; and,
receiving electrical resistance information from the external load and determining the power need of the external load according to a lookup table included in the control module computer readable medium.

9. The portable power system of claim 8 wherein the set of control module computer readable instructions includes instructions for determining the power needs of the external load, determining a combination of battery cells in the discharge set needed to supply power according to the power needs of the external load and sending a charge discharge instruction to the cell controller of each battery cell in the combination of battery cells to supply power to the external load.

10. The portable power system of claim 8 wherein the enclosure is configured to carry battery cells along the lateral interior perimeter and bottom interior perimeter of the enclosure.

11. The portable power system of claim 8 including a charge sensor included in the cell controller.

12. The portable power system of claim 8 including a cell switch included in the cell controller.

13. The portable power system of claim 8 including a set of cell controller computer readable instruction included in each cell controller for determining the charge of the battery cell attached to the cell controller.

14. A portable power system comprising: an enclosure; a charge set of battery cells disposed in the enclosure; a discharge set of battery cells disposed in the enclosure; a power outlet carried by the enclosure configured to supply power to an external load; a control module disposed in the enclosure and in communications with the set of battery cells and the power outlet and programmable for receiving a first charge information from a first cell controller, receiving a second charge information from a second cell controller, determining if the first charge information is higher than the second charge information, sending a balancing instruction to the first cell controller to delivery power from a first battery cell to a second battery cell; monitoring the first charge information while the first battery cell is being charged from an external power source, determining if the first charge information is equal to or higher than a predetermined charge percentage, sending a cease charging instruction to a first cell controller attached to the first batter cell when the first charge information is equal to or greater than said predetermined charge percentage;

supplying power from said external power source to the charge set of battery cells and transferring power from the discharge set of battery cells to the external load contemporaneously; and, supplying a first amount of power from said first battery cell to the external load, determining a first power draw of the external load, supplying a second amount of power from said second battery cell to the external load, determining a second power draw of the external load, comparing the first power draw to the second power draw and if the second power draw is equal to or greater than the first power draw, removing the supply of power from the second battery cell to the external load.

15. The portable power system of claim 14 including a solar panel in communication with the control module and wherein the control module is programmable into a hybrid power configuration.

16. The portable system of claim 15 wherein the control module is programmable into a battery-only configuration.

17. The portable system of claim 16 wherein the control module is programmable into a solar-only configuration.

* * * * *